W. B. LASHAR.
PLATE WELDING PROCESS AND ARTICLE.
APPLICATION FILED MAY 31, 1917.

1,261,943.

Patented Apr. 9, 1918.

Inventor
Walter B Lashar

Harry L Duncan Attorney

UNITED STATES PATENT OFFICE.

WALTER B. LASHAR, OF BRIDGEPORT, CONNECTICUT.

PLATE-WELDING PROCESS AND ARTICLE.

1,261,943.     Specification of Letters Patent.     Patented Apr. 9, 1918.

Application filed May 31, 1917. Serial No. 171,844.

*To all whom it may concern:*

Be it known that I, WALTER B. LASHAR, a citizen of the United States, residing at Bridgeport, Fairfield county, State of Connecticut, have made a certain new and useful Invention Relating to Plate-Welding Processes and Articles, of which the following is a specification, taken in connection with the accompanying drawing, forming part of the same.

This invention relates especially to processes of electrically welding relatively thin plates by previously or simultaneously with the welding operation forming therein more or less interlocking cup-shaped bosses or protruding portions and forcing or wedging these parts together so as to preferably form a ring or eyelet weld extending around the welded protruding boss or projection which also promotes by its interlocking action the alinement and strength of the welded joint.

In the accompanying drawing showing in a somewhat diagrammatic way illustrative methods of carrying out this process, Figure 1 is a sectional view taken transversely through the plates to be welded and the related electrodes.

Figure 1:
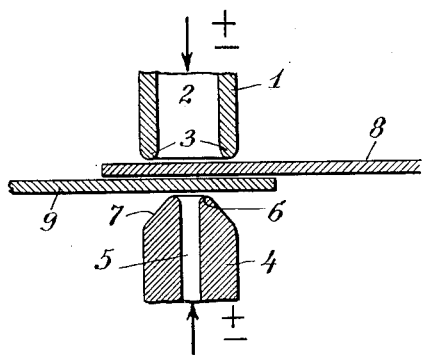

The formation of projections or protuberances on thin plates is of great assistance in forming electric welds between them and the strength of such welded joints is greatly increased if the welded parts are sufficiently interlocked as by the formation of a more or less cup-shaped protrusion or boss in the welded plates to maintain them in alinement. This also materially assists the electric welding because with such interlocking cup-shaped bosses their angularly arranged edges may be powerfully forced together so that the weld can readily be made in ring form around the boss, giving what may be considered a ring or eyelet weld. For this purpose the interlocking protrusions on the relatively thin plates may be formed by preliminarily punching or stamping similar cup-shaped protrusions in the plates, or if desired, this may be accomplished in connection with the electric welding operation by the use of suitably formed electrodes which may, if desired, have this action on the plates when they are more or less softened by the current. As shown in Fig. 1, the electrode may, if desired, comprise a cup electrode 1 having a central aperture 2 and a rounded inner edge 3 for contact with the thin plate 8, this edge more or less gradually merging into the contour of the flat plate at its outer portion. This electrode is supplied with the usual large volume alternating current for welding purposes and is also solidly mounted in the machine in connection with the opposing electrode 4 so that the two can be powerfully forced together during the combined shaping and welding operation. The punch electrode 4 may, if desired have a central aperture 5 and a relatively small area rounded point 6 arranged to engage the relatively thin plate 9 at a point opposite the opening in the cup electrode, this punch electrode preferably also having a conical wedging face, such as 7.

Figure 2:
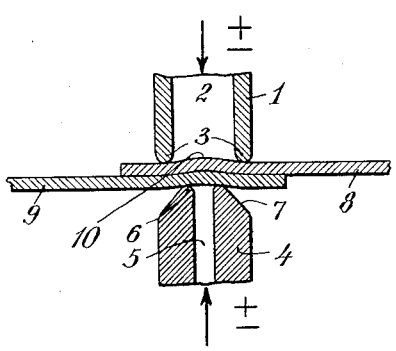
Fig. 2 is a similar view showing the parts in a different position.
Figure 3:
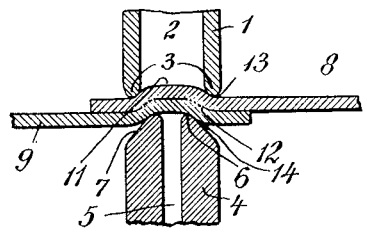
Fig. 3 is a similar view through the parts when the weld is substantially formed.

By the use of such electrodes interlocking projecting bosses can be formed on the plates during the welding heat and for this purpose the electrodes are forced together with sufficient power to bulge up the plates within the cup electrode as indicated at the point 10 in Fig. 2, while the current is turned on sufficiently to facilitate this shaping operation which is of course continued until interlocking protruding bosses of the desired height are formed in the two plates. As indicated in Fig. 3 these bosses when formed are powerfully forced together at their inclined meeting edges, this action being promoted by the more or less wedging action of the conical or wedging face 7 of the punch electrode in connection with the larger diameter edge of the opposing cup electrode and when the full welding current or heat has been attained a thorough and satisfactory weld can readily be formed between these parts 12, which may, of course, be forced into still more angularly protruding position to secure still stronger interlocking action, if desired. Such a ring or eyelet weld between interlocking protruding bosses gives a strong and reliable joint between the plates, the protruding bosses, such as 11, which are usually surrounded by a ring crease 13 being unobjectionable in many finished articles and in fact more or less resembling the usual rivet heads in riveted joints. On the under side of the joint a more or less conical depression 14 is formed, the exact shape of which is of course dependent on the contour of the welding electrodes used. Such interlocking eyelet welds can be readily and quickly made with ordinary welding apparatus in plates having a thickness up to one-quarter of an inch or so, and of course by the use of heavier electrical and mechanical devices still heavier plates can be united in this way, if desired. It is, of course, understood that where a continuous seam is to be formed between the lapping edges of such plates eyelet welds of this character may be made at suitable intervals along the seam, one or more rows of them being made as desired or necessary to give the maximum strength and stiffness to the joint which is naturally much stronger than a riveted joint because the plates are not perforated and weakened.

This invention has been described in connection with a number of illustrative devices, forms, parts, materials and arrangements of apparatus, orders of steps, conditions, methods and products, to the details of which disclosure the invention is not to be limited, since what is claimed as new and what is desired to be secured by Letters Patent is set forth in the appended claims.

I claim—

1. The process of electrically welding thin lapping plates which comprises electrically heating opposed portions of said plates and forming interlocking cup shaped protruding bosses in said plates and forcing the meeting edges of said bosses together while a welding current passes through them to form an annular weld between the protruding portions of said plates.

2. The process of electrically welding thin lapping plates which comprises electrically heating opposed portions of said plates and forming interlocking protruding bosses in said plates and forcing said bosses together while at a welding heat to form a weld between the protruding portions of said plates.

3. The process of electrically welding thin lapping plates which comprises forming interlocking cup shaped protruding bosses in said plates and forcing the angularly arranged meeting edges of said bosses together while a welding current passes through them to form an annular weld between the interlocked protruding portions of said plates.

4. The process of electrically welding lapping plates which comprises forming interlocking protruding bosses in said plates and forcing the meeting edges of said bosses together while a welding current passes through them to form an annular weld between the interlocked protruding portions of said plates.

5. The process of electrically welding lapping plates which comprises forcing them together and simultaneously heating them by the electric current flowing through them and forming interlocking protruding bosses in said plates and wedging together the angularly arranged meeting edges of said bosses for simultaneously welding them to form an annular weld between the protruding interlocked portions of said plates.

6. The process of electrically welding thin lapping plates which comprises forcing them together between a cup electrode and an opposing centrally located punch electrode and simultaneously heating them by the current flowing between said electrodes, forming interlocking protruding bosses in said plates and wedging together the outer angularly arranged meeting edges of said bosses and simultaneously welding them to form an eyelet weld between the protruding portions of said plate.

7. The process of electrically welding lapping plates which comprises forcing them together between a cup electrode and simultaneously heating them by the current flowing between said electrodes, forming interlocking protruding bosses in said plates and wedging together the meeting edges of said bosses and simultaneously welding them to form an eyelet weld between the protruding portions of said plates.

8. The welded joint connecting the lapping portions of thin plates comprising a plurality of interlocked cup shaped protruding bosses formed from portions of said plates each having an annular weld formed between the angularly arranged meeting edge portions of said protruding bosses.

9. The welded joint connecting the lapping portions of thin plates comprising a plurality of interlocked protruding bosses on said plates each having a weld formed between the meeting edge portions of said protruding bosses.

10. The welded joint connecting the lapping portions of plates comprising a plurality of protruding portions formed from portions of said plates and having an annular weld formed between the angularly arranged meeting edge portions of said protruding portions.

WALTER B. LASHAR.

Witnesses:
 CHARLES G. WILLIAMS,
 WILLIAM M. WHEELER.